(12) United States Patent
Skuratowicz

(10) Patent No.: US 8,507,666 B2
(45) Date of Patent: Aug. 13, 2013

(54) MODIFICATION OF CARBOHYDRATES USING CONTINUOUS GENERATION OF HYDROXYL RADICALS

(75) Inventor: Roman Skuratowicz, Hickory Hills, IL (US)

(73) Assignee: Corn Products Development, Inc., Westchester, IL (US)

(*) Notice: Subject to any disclaimer, the term of this patent is extended or adjusted under 35 U.S.C. 154(b) by 44 days.

(21) Appl. No.: 12/862,340

(22) Filed: Aug. 24, 2010

(65) Prior Publication Data

US 2012/0053338 A1    Mar. 1, 2012

(51) Int. Cl.
*C07H 1/00* (2006.01)
*C07H 3/00* (2006.01)
*C08B 37/00* (2006.01)

(52) U.S. Cl.
USPC ........................................................ 536/124

(58) Field of Classification Search
USPC ........................................................ 536/124
See application file for complete search history.

(56) References Cited

U.S. PATENT DOCUMENTS

| | | | |
|---|---|---|---|
| 2,307,684 A | 1/1943 | Kauffmann et al. |
| 2,354,838 A | 8/1944 | Schopmeyer et al. |
| 2,648,629 A | 8/1953 | Dvonch et al. |
| 2,680,078 A | 6/1954 | Jarvi |
| 2,713,553 A | 7/1955 | Mehltretter |
| 2,830,941 A | 4/1958 | Mehltretter |
| 3,131,137 A | 4/1964 | Lancaster et al. |
| 3,203,885 A | 8/1965 | Meiners et al. |
| 3,211,564 A | 10/1965 | Lauterbach |
| 3,313,641 A | 4/1967 | Borchert |
| 3,352,773 A | 11/1967 | Schwartz et al. |
| 3,417,017 A | 12/1968 | Kolaian et al. |
| 3,493,561 A | 2/1970 | Kolaian et al. |
| 3,539,366 A | 11/1970 | Ewing |
| 3,540,905 A | 11/1970 | Plunkett |
| 3,547,907 A | 12/1970 | Shepherd et al. |
| 3,561,933 A | 2/1971 | Restaino et al. |
| 3,634,395 A | 1/1972 | Walon |
| 3,635,857 A | 1/1972 | Restaino et al. |
| 3,655,644 A | 4/1972 | Durand |
| 3,691,155 A | 9/1972 | Kolaian |
| 3,703,508 A | 11/1972 | Heit et al. |
| 3,975,206 A | 8/1976 | Lotzgesell et al. |
| 4,097,427 A | 6/1978 | Aitken et al. |
| 4,115,146 A | 9/1978 | Saint-Lébe et al. |
| 4,343,654 A | 8/1982 | Ware et al. |
| 4,373,099 A | 2/1983 | Hubbard et al. |
| 4,437,954 A | 3/1984 | Sammells et al. |
| 4,838,944 A | 6/1989 | Kruger |
| 5,358,559 A | 10/1994 | Fitt et al. |
| 5,383,964 A | 1/1995 | Sue et al. |
| 5,417,755 A | 5/1995 | Sue et al. |
| 5,677,374 A | 10/1997 | Hamunen et al. |
| 5,866,533 A | 2/1999 | Beck et al. |
| 6,332,632 B1 | 12/2001 | Hodges |
| 6,398,912 B1 | 6/2002 | Vihervaara et al. |
| 6,617,447 B2 | 9/2003 | Gnad et al. |
| 6,670,470 B1 | 12/2003 | Ketola et al. |
| 6,710,175 B2 | 3/2004 | Anderson et al. |
| 2003/0051726 A1 | 3/2003 | Leininger et al. |
| 2006/0263510 A1 | 11/2006 | Skuratowicz et al. |
| 2008/0039615 A1* | 2/2008 | Skuratowicz ............. 536/2 |

FOREIGN PATENT DOCUMENTS

| | | |
|---|---|---|
| DE | 198 36 519 A1 | 2/2000 |
| EP | 1 826 219 | 8/2007 |
| JP | 59-157292 | 9/1984 |
| WO | WO-2004/060834 | 7/2004 |

OTHER PUBLICATIONS

Harmon, R. E. et al., "Oxidation of Starch by Hydrogen Peroxide in the Presence of UV Light—Part I," Die Stärke, 1971, No. 10, pp. 347-349.
Harmon, R. E. et al., "Oxidation of Starch by Hydrogen Peroxide in the Presence of UV Light—Part II," Die Stärke, 1972, vol. 24, No. 1, pp. 8-11.
Office action received in Chilean Patent Application No. 2069-2011 dated Feb. 15, 2013 (8 pages).
Examination Report received in Pakistan Application No. 611/2011, received Sep. 24, 2012 (1 page).
Office Action received in Russian Application No. 2011135232 dated Nov. 21, 2011. (4 pages) (English summary provided).
Extended European Search Report received in European Application No. 11 17 8504.4 dated Oct. 28, 2011 (5 pages).

* cited by examiner

*Primary Examiner* — Scarlett Goon
(74) *Attorney, Agent, or Firm* — Foley & Lardner LLP

(57) ABSTRACT

Disclosed herein are methods for modifying carbohydrates using hydroxyl radicals. The hydroxyl radicals may be formed by the photolysis of peroxide in aqueous solution using UV light. Also disclosed are compositions and products comprising carbohydrates modified by the process.

19 Claims, 1 Drawing Sheet

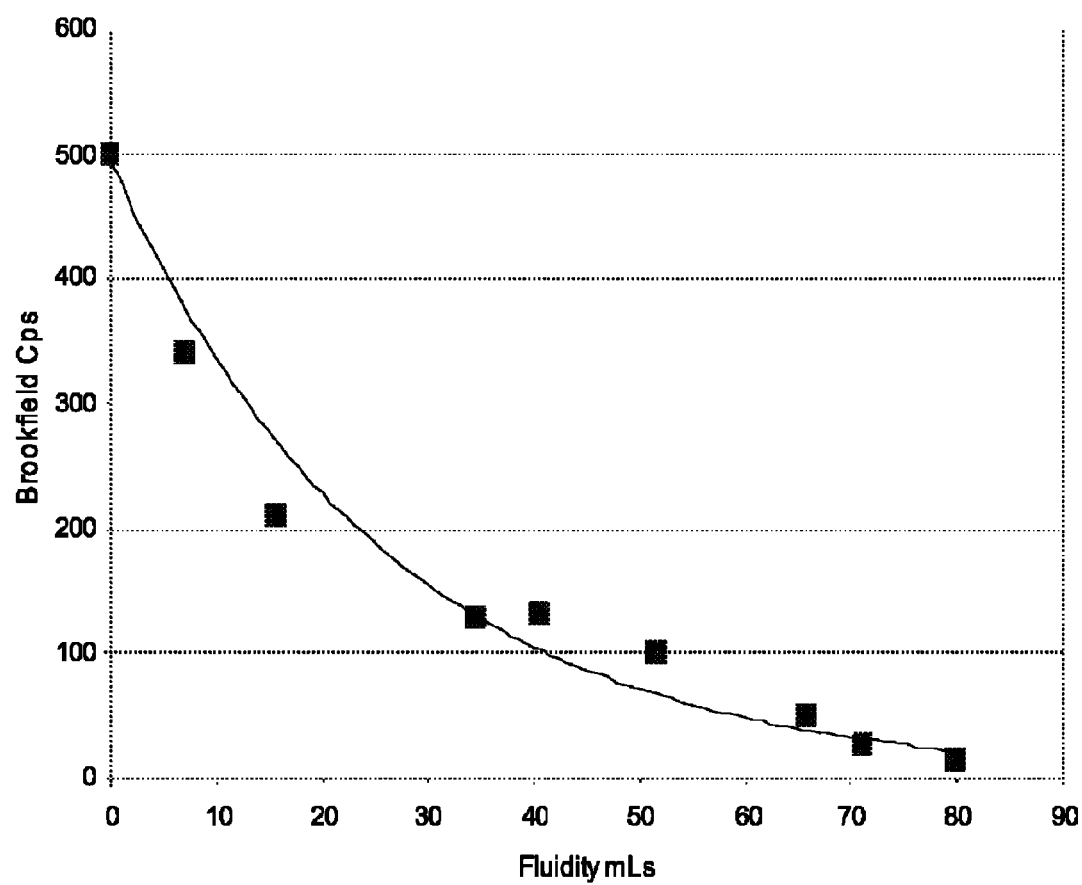

MODIFICATION OF CARBOHYDRATES USING CONTINUOUS GENERATION OF HYDROXYL RADICALS

TECHNICAL FIELD

The present technology relates generally to the field of modified carbohydrates.

BACKGROUND

The following description is provided to assist the understanding of the reader. None of the information provided or references cited is admitted to be prior art.

The modification of carbohydrate can be divided into two main types: chemical and rheological. Chemical modification generally refers to the substitution of a carbohydrate with chemical groups, which changes the charge condition of the carbohydrate or increases the stability. Chemical modification of carbohydrates generally occurs via the introduction of functional groups that change the carbohydrate properties. The properties of modified carbohydrates depend on the type of functional group or substituents as well as the degree of substitution. Modification can be achieved by various methods such as bleaching, oxidation, acetylation, acid modification, etherification, esterification, cross-linking, etc. Rheological modifications are generally used when higher dry matter contents are desirable in a solution, which means decreasing the viscosity by hydrolysis or oxidation. For hydrolysis, enzymes or acids can be used. Acid conversion is performed by adding acid to hydrolyze the starch and reduce viscosity.

Oxidation is one of many types of carbohydrate modification processes. Oxidation is the transfer of electrons between an oxidant and a reducing end, which leads to degradation of polymer chain lengths and formation of carbonyl and carboxyl groups on the carbohydrate molecule. Oxidation generally involves treating the carbohydrate with bromine, chlorine or the corresponding metal hypohalite in an alkaline aqueous medium, e.g., the treatment of carbohydrate with hypochlorite, such as sodium hypochlorite. Hypochlorite oxidation of carbohydrates, although commonly employed in the industry, is known to be associated with drawbacks such as generation of chlorinated volatile organic compounds (VOCs), some of which are toxic and probable human carcinogens, have relatively short shelf-life and bio-treatment inhibition due to overdosing.

Regarding starch, for example, oxidation typically involves opening and cleavage of various linkages in the starch molecule. Starch is a glucose polymer which consists of glucose units linked together by ether bonds at the 1,4 points on the glucose ring to make the linear backbone, with additional branches to the polymer linked at the 1,6 unit on the ring. Oxidation will cleave these ether linkages, reducing molecular weight of the starch molecules. In addition, they can also cleave the glucose ring between the 2, 3 units, and can additionally convert one or both of these resulting aldehyde groups to carboxyls. The choice of oxidant, amount of alkali, temperature and reaction time can cause different rates of thinning as well as vary the amount of carboxyls produced in the thinned starch through the oxidation process. Other selective oxidants, like periodate, will only attack certain bonds on starch, with periodates attacking the 2-3 linkage. Some of the predominant reactions taking place during starch oxidation are: (a) oxidation of primary hydroxyls at C-6 position to carboxyl groups forming uronic acid; (b) oxidation of secondary alcohols to ketones; (c) oxidation of glycols at C-2 and C-3 position to aldehydes; and (d) oxidation of aldehyde end groups to carbonyl groups. Oxidation of starch may, therefore, result in the formation of a mixture of carbonyl and carboxyl groups.

Free radical chemistry has not been used extensively in commercial carbohydrate or starch manufacture. Free radicals are created when an unpaired electron is induced on a material, either through a chemical initiator or cleavage of a chemical bond. The radical electron is very unstable and will react readily with many materials. One example of a free radical is a hydroxyl radical, which is formed when a peroxide material such as hydrogen peroxide is cleaved into radicals. This can be accomplished by treating the material with excited energy such as ultraviolet light. Free radical reactions typically proceed continuously as long as there is a feed source for reaction. Feed sources and types of free radical reaction can vary significantly. In free radical polymerization, the feed source is monomer and the reaction creates a polymer from free radical linkages. As long as the monomer is present, the reaction proceeds. In free radical sterilization, the feed source is ultraviolet light and the reaction is a disruption or cleavage of chemical bonds. Likewise, in this case, the reaction proceeds as long as UV energy is supplied. However, free radical reactions will typically have a residual radical or radical source material after the reaction. This lets the free radical reaction continue to proceed as long as the chemical or energy acting as a feed source is present. Many chemicals that can function in one chemistry, such as oxidants, can also be used in free radical reactions if they are treated with a sufficient level of reactive energy, such as ultraviolet light.

In the present specification, all parts and percentages are on a weight by weight basis unless otherwise specified.

SUMMARY

In accordance with one aspect, the present technology relates to methods for hydroxyl radical modification of carbohydrates. In one embodiment, the present disclosure provides a method for modifying a carbohydrate comprising forming a carbohydrate slurry with a solvent and reacting the carbohydrate with hydroxyl radicals, wherein the hydroxyl radical is generated by the photolysis of a catalytic amount of peroxide in aqueous solution using UV light, in a reactor, and the ratio of UV light to peroxide is in the range of about 20-500 watts/g. By "catalytic amount of peroxide," it is meant that the peroxide acts as a catalyst in this reaction, and will continue to regenerate into hydroxyl radicals and react with the carbohydrate as long as the UV light is applied in sufficient quantity.

In one embodiment, the ratio of UV light to peroxide is in the range of about 30-200 watts/g. In some embodiments, the ratio of peroxide to carbohydrate is in the range of about 0.1 to 2.5% wt/wt. In other embodiments, the ratio of peroxide to carbohydrate is in the range of about 0.5 to 1.3% wt/wt. In one embodiment, the carbohydrate slurry has a percentage of solids from about 30% to about 50%.

In some embodiments, the solvent used to form the carbohydrate slurry is water. In some embodiment, the peroxide is selected from the group consisting of hydrogen peroxide, sodium peroxide, calcium peroxide and combinations thereof. In some embodiments, the carbohydrate is selected from the group consisting of starch, a hydrocolloid and cellulose. In an illustrative embodiment, the starch is a modified starch. In some embodiments, the starch is cooked.

In some embodiments, the pH of the slurry is maintained between 7 to 11 during the course of the reaction. In some embodiments, the pH is maintained by the addition of an alkali to the slurry prior to or during the reaction step. In some embodiments, the alkali is an alkali metal hydroxide. In some embodiments, the alkali metal hydroxide is selected from the group consisting of sodium hydroxide, potassium hydroxide and combinations thereof.

In one embodiment, the reactor used in the present methods is a continuous hydroxyl radical reactor. Such a reactor will provide sufficient UV light to penetrate into the reaction solution and continuously regenerate the peroxide catalyst into hydroxyl radicals for reaction with carbohydrate.

In some embodiments, the method comprises the additional step of a derivation reaction. In some embodiments, the derivation reaction is selected from the group consisting of cationization, esterification, etherification, phosphorylation, carboxymethylation and crosslinking.

In some embodiments, the method comprises the additional step of using a second catalyst during the hydroxyl radical reaction. In an illustrative embodiment, the second catalyst is titanium dioxide.

In accordance with one aspect, the present technology relates to a modified carbohydrate made using the present methods.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

FIG. 1 illustrates a plot showing the comparison of fluidity and Brookfield data for modified starch samples over a wide range of fluidities and viscosities.

DETAILED DESCRIPTION

Two publications by Harmon et al., *Die Starke*, 1971, 23, 347-349 and 1972, 24, 8-11, disclose the oxidation of starch using large quantities of hydrogen peroxide as oxidant in the presence of UV light. The process requires significantly high quantities of peroxide and results in a product which shows a decline in carboxyl content and increased thinning with an increase in pH. The focus of this work was the production of high carbonyl starch, with minimal emphasis on thinning of the starch. Carboxyl and carbonyl groups affect many properties of the modified carbohydrate affecting stability, color change and film properties of starch pastes. Different oxidation conditions have produced similar viscosity starch with different carboxyl or carbonyl content thereby resulting in oxidized carbohydrates with properties different from each other. Such oxidation reactions using high quantities of oxidant show a linear decline in the reaction as the oxidant is consumed over time.

The present inventor has discovered that carbohydrates can be modified by subjecting them to hydroxyl radical modification. Hydroxyl radical modification involves transfer of hydroxyl radicals onto the surface of the carbohydrate, which then react with the carbohydrate to depolymerize and cleave it, and also react with other components in the carbohydrate such as protein, lipids, etc., and result in modified starch products that produce clearer pastes and bright white gels as compared to oxidized starch. Hydroxyl radical modification requires different reaction conditions, proceeds via a different mechanism and produces more distinguishable products than oxidation. For example, the reactions conducted by Harmon were required to be dilute solutions by necessity, 2% solids, so that UV light can penetrate the solution. UV light is provided in low doses, and very high doses of peroxide relative to starch are applied. UV light is applied at only 6.8 watts/g peroxide, but peroxide is applied to starch at a greater than 83% ratio. Under these conditions, the reaction behaves like a typical oxidation reaction, with reaction rate decreasing as peroxide is consumed, and very little thinning even with the high ratio of peroxide to starch, reducing viscosity by only 2.5×. By contrast, the hydroxyl radical reaction is continuous, and the reaction will proceed as long as catalytic amounts of peroxide are present and sufficient UV light is applied. Commercial production solids of 30-50% can be achieved with a continuous reactor that allows transmission of UV light into highly agitated solutions. UV light is applied at much higher levels, 20-500 watts/g peroxide, sufficient to continually produce hydroxyl radicals rather than catalyze the oxidation of starch with peroxide. Peroxide is added to the reaction at catalytic levels, only 0.1-2.5% ratio to starch. Higher levels of peroxide relative to starch or lower levels of UV light compared to peroxide will result in oxidation, rather than the continuously-regenerating hydroxyl radical reaction. As a result, the hydroxyl radical reaction is an order of magnitude more efficient, reducing viscosity up to 30× in a much shorter time period. The end products are also compositionally different, as the oxidation reactions provide an excess of 0.5% carboxyls while hydroxyl radical modification results in 0.05-0.15% carboxyls for significantly thinner products.

In various embodiments, the present disclosure provides methods for modifying carbohydrates. Although various methods such as oxidation, acid modification, etherification, and esterification have been reportedly employed to achieve thinning of a variety of carbohydrates, each of these methods provide a product having different physiochemical properties and, consequently, variable applications. Quite often, these methods require excessive amounts of oxidants, acids, inorganic and organic bases, acid anhydrides, acid chlorides, ethers or other harsh chemicals. Further, several of these processes give poor yields and result in side reactions such as hydrolysis. Some of these processes are accompanied by a very high degree of depolymerization. Few methods are known which can achieve an effectively lower viscosity carbohydrate using very low amounts of harsh chemicals and at the same time result in a product which has wide variety of industrial application. The present inventor has discovered that using a combination of very low amounts of peroxide reaction and strong UV light, hydroxyl radicals can be generated and used to modify carbohydrates to yield a product with desired physiochemical properties and a broad range of applications. The inventor has discovered that in order to achieve continuous hydroxyl radical modification with UV light and peroxide catalysts, certain thresholds must be achieved. The amount of UV light to apply to peroxide needs to be above 20 watts/g peroxide in order to achieve sufficient cleavage of the peroxide to hydroxyl radicals before they react as oxidants. Peroxide accordingly is added to starch solutions or slurries in catalytic amounts, 0.1-2.5% in order to allow this high UV light ratio and to ensure that the peroxide can be converted to hydroxyl radicals. This results in a continuous reaction that will proceed as long as UV light is applied. The only loss in efficiency of this reaction can come from a competing oxidation reaction, where peroxide which has not been converted to hydroxyl radicals will react with starch or other materials, thus reducing the available peroxide catalyst.

In the detailed description, the illustrative embodiments described in the detailed description, figures, and claims are not meant to be limiting. Other embodiments may be utilized, and other changes may be made, without departing from the spirit or scope of the subject matter presented here. In the description that follows, a number of terms are used extensively. The terms described below are more fully understood by reference to the specification as a whole. Units, prefixes, and symbols may be denoted in their accepted SI form.

The terms "a" and "an" as used herein mean "one or more" unless the singular is expressly specified. Thus, for example, reference to "a carbohydrate" includes a mixture of two or more carbohydrates, as well as a single carbohydrate.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to, plus or minus 10% of the particular term.

As used herein, the term "carbohydrates" will be understood by one skilled in the art to include polyhydroxy-aldehydes or -ketones and compounds derived therefrom. Carbohydrates can include compounds composed of at least one basic monosaccharide unit. They may be classified as simple carbohydrates and complex carbohydrates. Simple carbohydrates are monosaccharides and disaccharides. Complex carbohydrates are polysaccharides, or large molecules composed of straight or branched chains of monosaccharides.

As used herein the term "hydroxyl radical" is meant to represent an OH radical not containing an extra electron to cause a negative charge. In one embodiment of the present technology, hydroxyl radicals are generated by photolysis of a peroxide compound such as, for example, hydrogen peroxide, in presence of water. In other embodiments, hydroxyl radicals can also be generated by a reaction referred to as Fenton's reaction, wherein hydrogen peroxide is reacted with trace amounts of reduced transition metal catalysts. In still other embodiments, hydroxyl radicals may also be generated by electrochemical breakdown of water, peroxide or other hydroxyl containing chemicals.

In one aspect, a method for modifying a carbohydrate is provided. In one embodiment, the method comprises forming a carbohydrate slurry with a solvent and reacting the carbohydrate with hydroxyl radicals, wherein the hydroxyl radical is generated by the photolysis of peroxide in aqueous solution using UV light, in a reactor, and the ratio of UV light to peroxide is in the range of about 20-500 watts/g.

As an initial step, the carbohydrate may be combined with a suitable solvent to form a carbohydrate slurry. Any suitable solvent or solvents, e.g., water, organic solvents or a combination thereof, can be employed to form the carbohydrate slurry. Exemplary organic solvents include lower alcohols, such as methanol, ethanol, propanol and butanol. In an illustrative embodiment, the solvent is water.

The present methods are clean and green processes in that they employ very low amounts of peroxide compounds. In fact, the peroxide compounds are employed in catalytic amounts used exclusively for initial generation of hydroxyl radicals when exposed to UV light. Thus, in some embodiments, the ratio of UV light to peroxide is in the range of about 20-500 watts/g. In some embodiments, the ratio of UV light to peroxide is in the range of about 30-200 watts/g. In some embodiments, the ratio of UV light to peroxide is in the range of about 30-80 watts/g. Conventional methods use large quantities of oxidants which are consumed as the reaction proceeds. Conversely, in the present methods, the peroxide compound is continuously photolyzed and regenerated instead of being consumed.

Any suitable peroxide compound which generates hydroxyl radicals when exposed to UV light can be employed in the present methods. Exemplary materials can be inorganic peroxides, e.g., hydrogen peroxide, sodium peroxide, organic peroxides, e.g., alkyl- and aryl-hydroperoxides or dialkylperoxides. Non peroxide oxidants such as sodium hypochlorite do not form hydroxyl radicals because they lack the double oxygen bond necessary, and would proceed by a different mechanism. Such oxidants treated under these conditions would be consumed in the reaction, so they could not be part of the continuous hydroxyl radical mechanism. In one embodiment, the peroxide is selected from the group consisting of hydrogen peroxide, sodium peroxide, calcium peroxide and combinations thereof. In an illustrative embodiment, the peroxide is hydrogen peroxide.

The hydroxyl radicals can be generated by photolysis of peroxide in aqueous solutions. In some embodiments, a UV radiation source, such as a UV light, can be used to photolyze the peroxide. The use of hydroxyl radicals reduces reaction time and chemicals necessary to modify the carbohydrate and provides a more efficient reaction. Because UV light applied in sufficient levels to peroxide will continuously regenerate hydroxyl radicals, the reaction will proceed as long as catalytic amounts of peroxide are available and sufficient UV light is applied.

A wide range of carbohydrates can be modified using the present methods. Suitable carbohydrates include sugars, starches, cellulose, hydrocolloids and many such other compounds or derivatives thereof. Other suitable carbohydrates may include dextrins and maltodextrins, corn syrups and other sugars. Although these carbohydrates may have radically different properties, they all share the same general composition, specifically they are polymers made of joined carbohydrate rings, connected by ether linkages which are readily hydrolyzed by either acids or oxidants, and the rings themselves can be cleaved by similar reactions. As a result, these rings and polymer chains all are reactive in similar fashion with hydroxyl radicals.

Cellulose is a straight chain polymer made of repeating units of the monomer glucose. The monomers are linked together through 1,4 glycosidic bonds. Hemicellulose is an example of a hydrocolloid useful in the technology. Hemicelluloses are described in U.S. Pat. No. 5,358,559, which is incorporated herein in its entirety by reference. Other hydrocolloids that may be used include gum arabic, xanthan gum, gum karaya, tragacanth, sodium alginates, carageenan, Guar gum, Locust bean gum, tara, pectins, gellan, cellulose derivatives such as carboxymethyl, methyl or ethyl cellulose, microcrystalline cellulose, or other polysaccharide type hydrocolloids. Combinations of hydrocolloids may also be used. Sugars are carbohydrate compounds comprising one or more saccharide units, usually an aldehyde or ketone derivative of a polyhydric alcohol. Exemplary sugars include glucose, fructose, galactose, arabinose, mannose, acetylgalactosamine, acetylglucosamine, etc.

Starch is a commodity chemical produced from the root, stem or fruit from a number of plants. It is a high molecular weight carbohydrate polymer which is comprised of linear and branched polysaccharide polymers and it can have moisture content from about 8% to about 20%, most commonly from about 11% to about 13%. Starches such as those derived from corn, wheat, barley, tapioca, potato and the like are suitable, as well as sorghum varieties which can be used in the present methods. Blends of starches from various sources can also be used. In some embodiments, the starches include pearl starches, powdered starches, granular or uncooked starches, and cooked or pregelled starches. Starches derived from other genetic forms of corn, such as high amylose and waxy corn, would also be suitable for use in the present methods. In some embodiments, the starch can be a natural unmodified starch or a starch modified by means other than the present methods. Thus, in one embodiment, the starch used in the methods can be a "modified starch" or a "previously modified starch." The present technology also includes the use of carboxymethyl, cationic or other modified carbohydrates.

The modified starch which is used in accordance with the present technology can be mechanically, chemically or heat modified. Compared to unmodified starches, modified starches frequently possess superior physical properties such as increased solubility, better film forming, increased whiteness, improved gel strength, viscosity stability, increased adhesivity, improved resistance to shear and increased resistance to freeze thaw degradation. Modified starches or carbohydrates that may be used include, for example, carboxymethyl, acetate, hydroxyethyl, hydroxypropyl, phosphate, crosslinked, octenylsuccinate, cationic starch or cooked starch.

An example of a chemically modified starch which can be used in the present technology and is commercially available is Farmal™ MS 6407 modified starch. This modified starch is a crosslinked acetate starch and is available from Corn Products International, Inc., Westchester, Ill., USA ("Corn Products").

In one embodiment, the carbohydrate used in the present methods is cooked starch Cooked starch, such as cooked starch paste, may be modified with the hydroxyl radicals in the process and can be thinned under alkaline, neutral or acidic conditions.

The present methods can be surprisingly used to modify large quantities of carbohydrates using catalytic quantities of peroxides. Thus, in one embodiment, the ratio of peroxide to carbohydrate is in the range of about 0.1 to 2.5% wt/wt. In some embodiments, the ratio of peroxide to carbohydrate is in the range of about 0.2 to 1.5% wt/wt. In some embodiments, the ratio of peroxide to carbohydrate is in the range of about 0.5 to 1.3% wt/wt. All ratios are calculated on the basis of dry weights.

Another advantage of the present methods is that they can be employed to modify carbohydrate slurries having an exceedingly high percentage of solids than is possible using conventional methods. In one embodiment, the carbohydrate slurry has a percentage of solids greater than about 10%, greater than about 20%, greater than about 30% to about 50%. In some embodiments, the carbohydrate slurry has a percentage of solids from about 30% to about 50%.

The carbohydrate modification reaction may be carried out at a wide range of PH and occur either under neutral, acidic or alkali conditions. In one embodiment, the pH can be controlled so as to keep it at a constant value or at a constant range during the whole duration of the process. In some embodiments, an acid or an alkali, or combinations thereof, may be added to the slurry to control or maintain the pH while the slurry is being formed and/or after the slurry is established and/or during the reaction. In some embodiments, the pH of the slurry may be about 2 to about 12. In some embodiments, the pH of the slurry is about 5 to about 12. In some embodiments, the pH of the slurry is about 4 to about 6. In some embodiments, the pH of the slurry is about 7 to about 11. In some embodiments, the pH of the slurry is about 9 to about 12. In some embodiments, the pH is maintained by the addition of an alkali to the slurry prior to or during the reaction step.

Suitable alkaline substances used to control the pH during a reaction are known in the art and can be employed in the present methods. In some embodiments, the alkali is an alkali metal hydroxide. In some embodiments, the alkali metal hydroxide is selected from the group consisting of sodium hydroxide, potassium hydroxide, calcium hydroxide, sodium carbonate, potassium carbonate and combinations thereof.

In some embodiments, the present methods may be combined with a derivation reaction. Any suitable derivation reaction known in the art such as cationization, esterification, etherification, phosphorylation, carboxymethylation, crosslinking and the like, can be used in combination with the present methods to provide modified carbohydrate derivatives. The derivation reactions can be performed either before or after the carbohydrate is modified using present methods.

In some embodiments, the hydroxyl radical reaction with the carbohydrate may be accelerated by use of an additional catalyst. Any suitable photo-catalyst such as titanium dioxide, zinc oxide, cadmium sulfide, tin dioxide, and zirconium dioxide can be used to accelerate the carbohydrate modification reaction. In an illustrative embodiment, the additional catalyst is titanium dioxide. The reaction may, however, proceed without an additional catalyst. In some embodiments, gel inhibitors such as sodium sulfate or sodium chloride may be added to the slurry prior to, during or after the hydroxyl radical reaction.

The carbohydrate modification process can be conducted in any suitable reactor known in the art and which can allow the photolysis reaction and the modification to be conducted. In one embodiment, the reactor used in present methods is a continuous hydroxyl radical reactor. This reactor is continuous in that it continuously generates and regenerates hydroxyl radicals, starting from a small quantity of hydroxyl radicals. One such example of a continuous reactor is a photoreactor designed as a series of tubes or pipes, containing UV light throughout the length of the reactor and having suitable thickness for the carbohydrate slurry to be circulated through it, while being adequately exposed to a sufficient amount of UV light to create hydroxyl radicals continuously. The thickness of the tubes can be adjusted to ascertain that the UV light can infiltrate slurries with high concentrations of solids. The turbulence caused by the circulating slurry and the suitable thickness of the tubes ensures that the UV light can sufficiently penetrate the opaque slurry and reacts with the peroxide compound or reagent and produce hydroxyl radicals continuously. One such example of the continuous hydroxyl radical reactor used in the present technology is known as the Photo Cat or the Mobil Cat system from PURIFICS® ES, London, Ontario, Canada.

Another unique feature of the present methods is that the degree of modification can be controlled with greater ease than compared to conventional methods. For example, when the light source, such as the ultraviolet light, is turned off, the reaction stops but can be restarted when the light source is turned back on. With a conventional hypochlorite or acid modification process, it is difficult and time consuming to restart the reaction once it is halted.

Without being bound to a theory, it can be hypothesized that the UV light photolyzes the peroxide compound to form hydroxyl free radicals. These will then react with carbohydrates in an acid degradation reaction, primarily cleaving the starch chains in a random fashion. As the free radicals cleave the starch, they will be converted back into a suitable peroxide-like compound, thus making themselves available to be cleaved in UV light again. This reaction will continue to proceed as long as the peroxide compound is available and sufficient UV light is applied. If insufficient UV light is available to cleave all of the peroxide compound, then it will perform a competing oxidation reaction. If oxidation is the predominant reaction, then the peroxide becomes unavailable to be converted into hydroxy free radicals. The high ratio of UV light to peroxide used in the present methods minimizes the competing oxidation reaction so that the primary reaction taking place is the hydroxyl radical modification of carbohydrates. UV light is thus the primary reactant in the present methods, while peroxide acts as the catalyst.

Additional advantages associated with the present methods will be readily apparent to one skilled in the art. For example, the present methods require lower chemical usage than conventional methods for modifying carbohydrate. The methods do not involve chlorine based oxidizers, such as in hypochlorite oxidation which produces alkyl halides. Also, the methods do not involve acids which may introduce potentially corrosive chloride compounds. Thus, the methods do not produce alkyl halides, which is a processing benefit for wastewater treatment, and the resulting product will not contain alkyl halides or halogens (e.g., chloride compounds), which expands the utility of the modified carbohydrate from the process of the invention.

In one aspect, the present technology provides the modified carbohydrate product made using the present methods. As will be readily apparent to one of ordinary skill in the art, from the experimental data disclosed herein, the product is different from other modified carbohydrate products, such as oxidized starch, in that it has a lower carboxyl content relative to the viscosity of the final product. Typical oxidized starches will produce much higher levels of carboxyls when reduced to a viscosity target. For the purposes of comparison, FIG. 1 shows viscosity in centipoise (cps) changes vs commercial starch fluidity. Fluidity is commercially used determination of thinned starches. For example, a starch used as a size press starch in paper manufacture would be characterized as a 70 fluidity starch (example, 055720 grade oxidized starch from Corn Products). Such a product would typically have 0.4% carboxyl at that level of thinning and have a viscosity of about 40 cps at 35° C., 5% solids and pH 7 when pasted. By contrast, hydroxyl modified starch at similar viscosity or fluidity would have less than 0.15% carboxyl content. Thus, in some embodiments, the modified carbohydrates obtained by the present technology have a carboxyl content of about 0.01% wt/wt to about 0.5% wt/wt. In some embodiments, the modified carbohydrates have a carboxyl content of about 0.02% to about 0.4% wt/wt. In an illustrative embodiment, the modified carbohydrates have a carboxyl content of about 0.05% to about 0.15% wt/wt.

In some embodiments, the modified carbohydrates obtained using the present technology have viscosities in the range of about 0.1 to about 200 cps. This viscosity is determined by pasting the starch at 5% solids and pH 7 by cooking at 95° C. for 15 minutes, then cooling to 35° C. and measuring viscosity with a suitable instrument. For comparison, the unmodified starch would have a viscosity of about 500 cps. Viscosity of the final product will depend on the amount of UV light and peroxide applied to starch, reaction pH, temperature, and time. In some embodiments, the modified carbohydrates obtained using the present technology have viscosities in the range of about 5 to about 170 cps. In an illustrative embodiment, the modified carbohydrates obtained using the present technology have viscosities in the range of about 15 to about 140 cps. As an alternative to viscosity, the fluidity of a product may be presented, in which the starch is pasted in alkali and the amount collected from a standardized funnel in a fixed amount of time is determined. Fluidities and viscosities are illustrated in FIG. 1 and can be used to predict one another.

The modified carbohydrate can be used in applications such as food, pharmaceuticals and cosmetic applications, where alkyl halides and halogens are undesired. The modified carbohydrates obtained using the present methods have broader end use applications than carbohydrates modified by conventional means. Also, carbohydrates can be thinned more efficiently and to higher levels by the present methods than can be achieved with typical modification methods known in the art, and cooked starch can be thinned in-situ.

The slurry resulting from the process can be dried to form an off-white modified powder comprising modified starch, or other carbohydrate, like cellulose and hydrocolloid. The powder can be re-hydrated and cooked to form a clear paste, particularly when the carbohydrate is corn starch. The paste will become bright white as the paste cools and sets back. The properties of the modified carbohydrates made by the process of the invention are different from that experienced with carbohydrates modified by other means. For example, hypochlorite modified starch is a white powder which pastes cloudy and turns brown with age, whereas acid thinned starches make off-white pastes. The improved paste color is a significant value to many industrial and food applications.

The modified carbohydrate product may be combined with additives to provide functionality or storage stability. Additives include viscosity stabilizers, functional chemicals and/or crosslinkers. Viscosity stabilizers useful in the invention include surfactants, fatty acid complexes, soaps and agents like monoglycerol stearate. Crosslinkers such as borax, and also insolubilizers like those available from Omnova Solutions, Inc., Fairlawn, Ohio, USA, under the tradename SEQUAREZ®, may be used in the invention. Other useful additives include bisulfites, urea, carbonates and the like.

The modified carbohydrate has a number of uses and may be incorporated into a number of products. For example, pastes made from the modified carbohydrate provide viscosity reduced carbohydrates for corrugating adhesives, paper sizing and paper coatings. The modified carbohydrate, in powder form or in a paste, can be used as a thickener in foods, as well as in other food applications, such as for texturizing, gels, fat replacement, dusting and the like. The modified carbohydrate may be used in pharmaceuticals and cosmetics for gels, pastes and lotions. The whiteness of pastes made from the modified carbohydrate, and lack of alkyl halides and halogens, resulting from the photoreaction or electrochemical conversion process, provide the modified carbohydrate product with a greater range of applications than with carbohydrates, such as starch modified through conventional means. Moreover, upon setback, the modified starch results in a white paste which makes the modified starch product particularly useful in applications where setback is preferred, such as in gypsum board and baking or confectionary applications.

EXAMPLES

Example 1

20 gallons of starch slurry comprising carbohydrate and water, at approximately 30% solids, was passed through a continuous hydroxyl radical reactor (Mobil Cat system from PURIFICS® ES, London, Ontario, Canada) with a ratio of 1.86% peroxide to starch, and sufficient sodium hydroxide to maintain a pH of 11. Each UV light rack provided 75 watts per 400 mls of solution, applying 30.1 watts UV per gram of peroxide in solution.

The modified starch product made in the continuous hydroxide radical reactor produced clearer pastes when cooked and bright white gels as compared to hypochlorite oxidized starch having similar fluidity characteristics. Pastes made from the modified starch had a Brookfield viscosity at 20% solids and about 65.5° C. (150° F.) of about 20 to 25 centipoise. Also, the pastes showed acceptable viscosity stability when stored for 30 minutes at 50° C. (122° F.).

Example 2

Starch, modified by reaction with hydroxyl radicals, was jet cooked at neutral pH, 133.3° C. (290° F.) and about 340 kilopascal (50 psi) backpressure. The paste has acceptable film characteristics when drawn down as a film or on paper, such as in surface size or coating applications.

Example 3

Lightly thinned hydroxyl radical treated starch was applied to corrugating adhesive as a carrier starch to increase adhesive cooked solids and provide carrier setback to create a tackier, stringier adhesive. The modified starch was cooked in a high shear mixer at about 37.8° C. (100° F.) with sufficient alkali to completely cook starch. Additional water, unmodified starch, and borax are added to complete the corrugating adhesive. The hydroxyl radical treated starch was typically 10-20% of the total starch in the adhesive. Alkali was added to sufficiently lower the gel temperature of the adhesive to below about 65.5° C. (150° F.), and borax was typically added at 50-100% of the dry caustic (in the form of sodium hydroxide) in the adhesive. The gel temperature refers to the uncooked or secondary portion of the adhesive which was suspended in the unmodified starch that acts as a carrier. The exact ingredients and proportions of ingredients in corrugating adhesives vary by plant and desired handling properties.

Example 4

Hydroxyl radical treated starch was jet cooked at about 137.8° C. (280° F.) and about 207 kilopascal (30 psi) backpressure. The cooked starch was mixed with a surfactant (VS100 from Magrabar Chemical Corporation, Morton Grove, Ill., USA) in an amount of about 0.5% by weight of the components in the paste. The resulting paste cools to an opaque white gel and has stable viscosity over several days storage. This paste may be incorporated with preservatives and as an active ingredient for lotion formulations.

Example 5

A 41% solids starch and water slurry was circulated through a PhotoCat reactor (PURIFICS® ES, London, Ontario, Canada) fitted with eight 75 watt UV bulbs in separate reaction tubes at the rate of 15 gpms. 1.26% peroxide db/starch was added to the slurry with sufficient 4% NaOH to maintain a pH of 11 during the reaction. Each reaction tube exposed 400 mls of slurry at a ratio of 30.6 watts/g peroxide in solution. Temperature was held at 30° C. with a water cooled jacket. Reaction was allowed to proceed for 125 min but samples were taken at 20, 40, 60, 95, and 125 min. The level of oxidants in the slurry at 0 min and 125 min were tested with a peroxide dipstick and found to show insignificant change in oxidants during the course of the reaction. Product samples were dewatered and dried in an air oven at 40° C. Fluidity was measured for each sample and is summarized in Table 1. The equivalent Brookfield viscosity was estimated for each fluidity value based on experimental data, which correlate fluidity to Brookfield viscosity at 5% solids and 35° C. for starches pasted at 95° C. for 15 minutes (presented in FIG. 1). Fluidity was measured by the CPC-SMA method known in the art and described in Example 11. Brookfield data represents modified starches pasted at 5% solids in a Brookfield RVT viscometer with SSB sample adaptor, 8 mL of starch at 5% solids and pH 7, pasting at 95° C. in the SSB, followed by cooling to the measurement temperature of 35° C. Fluidity and Brookfield data show that the viscosity of the modified starch decreased significantly with time. After 125 min of reaction, the carboxyl content of the product was 0.15%. For reference, untreated corn starch has a fluidity of 0 and viscosity of 500 cps under the Brookfield conditions.

TABLE 1

| Reaction time | Fluidity | Brookfield CPS equivalent 5% 35° C. |
|---|---|---|
| 20 min | 20 | 240 |
| 40 min | 54.4 | 80 |
| 60 min | 64.3 | 50 |
| 95 min | 76.4 | 20 |
| 125 min | 80.5 | 15 |

Example 6

Low pH, low peroxide and high UV dosage:—A 38% solids starch slurry was circulated through the PhotoCat reactor at the rate of 15 gpms with 0.52% peroxide db/starch was added to the slurry with sufficient 4% NaOH to maintain a pH of 7 during the course of the reaction. Temperature was held at 30° C. using a water cooled jacket. Reaction was allowed to proceed for 30 min. Resultant starch product was dewatered and dried at 40° C. Fluidity of the dried sample was 12, with a Brookfield viscosity equivalent of 210 cps for a 5% pasted solution at 35° C. The ratio of watt/g peroxide db in reaction tubes was 80.1.

Example 7

High pH, low peroxide and high UV dosage—A 38% solids starch slurry was circulated through the PhotoCat reactor at the rate of 15 gpms. 0.77% peroxide db/starch was added to the slurry with sufficient 4% NaOH to maintain a pH of 11.8 during the course of the reaction. Temperature was held at 30° C. with a water cooled jacket. Reaction was allowed to proceed for 125 min. Modified starch product was dewatered and dried at 40° C. Fluidity of the dried sample was 64, with a Brookfield viscosity equivalent of 45 cps for a 5% pasted solution at 35° C. Carboxyl content of the modified product was 0.11%. The ratio of watt/g peroxide db in reaction tubes was 50.8.

Example 8

Low pH, high peroxide and UV dosage—A 41% solids starch slurry was circulated through the PhotoCat reactor at the rate of 15 gpms. 1.26% peroxide db/starch was added to the slurry with sufficient 4% NaOH to maintain a pH of 8 during the course of the reaction. Temperature was held at 30° C. with a water cooled jacket. Reaction proceeds for 125 min. Modified starch product was dewatered and dried at 40° C. Fluidity of the dried sample was 25, with a Brookfield viscosity equivalent of 240 cps for a 5% pasted solution at 35° C. Carboxyl content of the modified product was 0.05%. The ratio of watt/g peroxide db in reaction tubes was 30.6. Conditions were identical to Example 5 except for the pH, and resulting product was much higher in viscosity (lower in fluidity) than the 80.5 fluidity, 15 cps product made at pH 11.

Example 9

Extended reaction—A 38% solids starch slurry was circulated through the PhotoCat reactor at the rate of 15 gpms.

0.77% peroxide db/starch was added to the slurry with sufficient 4% NaOH to maintain a pH of 9.8 during the course of the reaction. Temperature was held at 30° C. with a water cooled jacket. Reaction was allowed to proceed for 185 min, with an additional sample taken at 125 min. Modified starch product was dewatered and dried at 40° C. Fluidity was observed to be 70 for the 125 min sample and 75 for the 185 min sample. Brookfield viscosity equivalents were 40 and 25 cps respectively for a 5% pasted solution at 35° C. Carboxyl content of the products were 0.09 and 0.11%, respectively. Slurry even after 185 min continued to show residual oxidants, demonstrating that the reaction continues to proceed as long as catalytic amounts of peroxide and UV light are present. The ratio of watt/g peroxide db in reaction tubes was 50.1.

Example 10

No UV treatment—A 41% solids starch slurry was circulated through the PhotoCat reactor without any UV light at the rate of 15 gpms. 1.22% peroxide db/starch was added to the slurry with sufficient 4% NaOH to maintain a pH of 11 during the course of the reaction. Temperature was held at 30° C. using a water cooled jacket. Reaction was allowed to proceed for 120 min. A peroxide dipstick showed no residual oxidants after 120 minutes. Modified starch product was dewatered and dried at 40° C. Fluidity of the dried sample was 2, with a Brookfield viscosity equivalent of 450 cps for a 5% pasted solution at 35° C. Carboxyl content of the modified product was 0.03%. The product material showed evidence of oxidation rather than hydroxyl radical modification due to the higher ratio of carboxyl to fluidity. Because UV light was not introduced, the peroxide reacted as an oxidant, rather than forming the continuous hydroxyl radicals, even though similar levels of peroxide to starch were applied as previous examples.

Example 11

SMA F60 is an internal standard method of analysis. The method is explained here for illustrative purposes. 5 grams of dried starch at a moisture level of about 10% are dispersed in 70 mls of water in a 300 ml tall form beaker. The slurry is stirred at 200 rpm while 30 mls of 3% sodium hydroxide solution is added, and stirred for exactly 3 minutes. The resulting paste is then held at 25° C. for an additional 29.5 minutes. The paste is then poured into a calibrated fluidity funnel and at the 30 minute mark from when stirring was complete, allowed to drain into a graduated cylinder. The amount collected after 70 seconds is recorded and adjusted by any funnel calibration to determine the milliliters of fluidity.

Example 12

Insufficient UV light to peroxide ratio. A production run was made in the MobileCat reactor using 30% starch slurry at pH 11, 9.3% peroxide/starch and only 6.4 watts/g peroxide. Residual oxidants decreased significantly throughout the reaction as measured by peroxide test strips, and were consumed within 2 hours. Test results indicate at this lower UV light ratio, the continuous hydroxyl radical reaction will not proceed as the peroxide used as a catalyst is being consumed by the competing oxidation reaction.

While certain embodiments have been illustrated and described, it should be understood that changes and modifications can be made therein in accordance with ordinary skill in the art without departing from the technology in its broader aspects, as defined in the following claims.

The embodiments, illustratively described herein, may suitably be practiced in the absence of any element or elements, limitation or limitations, not specifically disclosed herein. Thus, for example, the terms "comprising," "including," "containing," etc., shall be read expansively and without limitation. Additionally, the terms and expressions employed herein have been used as terms of description and not of limitation, and there is no intention in the use of such terms and expressions of excluding any equivalents of the features shown and described, or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like, include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for modifying a carbohydrate comprising forming a carbohydrate slurry with a solvent and reacting the carbohydrate with hydroxyl radicals, wherein the hydroxyl radicals are continuously generated by the photolysis of peroxide in aqueous solution using UV light, and the ratio of UV light to peroxide is in the range of about 20-500 watts/g.

2. The method of claim 1, wherein the ratio of UV light to peroxide is in the range of about 30-200 watts/g.

3. The method of claim 1, wherein the solvent is water.

4. The method of claim 1, wherein the peroxide is selected from the group consisting of hydrogen peroxide, sodium peroxide, calcium peroxide and combinations thereof.

5. The method of claim 1, wherein the carbohydrate is selected from the group consisting of starch, a hydrocolloid and cellulose.

6. The method of claim 5, wherein the starch is a modified starch.

7. The method of claim 6, wherein the starch is cooked.

8. The method of claim 1, wherein the ratio of peroxide weight relative to carbohydrate weight is in the range of about 0.1 to 2.5% wt/wt.

9. The method of claim 8, wherein the ratio of peroxide weight relative to carbohydrate weight is in the range of about 0.5 to 1.3% wt/wt.

10. The method of claim 1, wherein the modifying takes place in a continuous hydroxyl radical reactor.

11. The method of claim 1, wherein the carbohydrate slurry has a percentage of solids from about 30% to about 50%.

12. The method of claim 1, wherein the pH of the slurry is maintained between 7 to 11.

13. The method of claim 12, wherein the pH is maintained by the addition of an alkali to the slurry prior to or during the reaction step.

14. The method of claim 13, wherein the alkali is an alkali metal hydroxide.

15. The method of claim 14, wherein the alkali metal hydroxide is selected from the group consisting of sodium hydroxide, potassium hydroxide and combinations thereof.

16. The method of claim 1, comprising the additional step of a derivation reaction.

17. The method of claim 16, wherein the derivation reaction is selected from the group consisting of cationization, esterification, etherification, phosphorylation, carboxymethylation and crosslinking.

18. The method of claim 1, comprising the additional step of using a catalyst during the hydroxyl radical reaction.

19. The method of claim 18, wherein the catalyst is titanium dioxide.

* * * * *